United States Patent
Na et al.

(10) Patent No.: US 11,895,168 B2
(45) Date of Patent: *Feb. 6, 2024

(54) APPARATUS AND METHOD FOR INFORMING OF AVAILABLE DEVICES IN CONTENTS SHARING NETWORK

(71) Applicant: Samsung Electronics Co., Ltd., Suwon-si (KR)

(72) Inventors: Sang-Tae Na, Naju-si (KR); Jin-Wook Lee, Yongin-si (KR); Young-Ki Kim, Seoul (KR); Chul-Seung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,414

(22) Filed: Feb. 13, 2023

(65) Prior Publication Data

US 2023/0199046 A1    Jun. 22, 2023

Related U.S. Application Data

(63) Continuation of application No. 17/451,298, filed on Oct. 18, 2021, now Pat. No. 11,582,273, which is a
(Continued)

(30) Foreign Application Priority Data

Jan. 31, 2012  (KR) .................. 10-2012-0009592

(51) Int. Cl.
*H04L 65/403*   (2022.01)
*H04L 67/51*    (2022.01)
(Continued)

(52) U.S. Cl.
CPC ............ *H04L 65/403* (2013.01); *H04L 67/51* (2022.05); *H04L 12/282* (2013.01);
(Continued)

(58) Field of Classification Search
CPC ........ H04N 21/42208; H04N 21/42209; H04L 12/2812; H04L 12/282; H04L 65/403; H04L 67/51; H04L 2012/2849
See application file for complete search history.

(56) References Cited

U.S. PATENT DOCUMENTS 7,589,726 B2  9/2009  Aholainen et al.
7,631,270 B2  12/2009  Cunningham et al.
(Continued)

FOREIGN PATENT DOCUMENTS

EP   1002407 A1   5/2000
EP   2073514 A2   6/2009
(Continued)

OTHER PUBLICATIONS

International Search Report dated May 30, 2013 in connection with International Application No. PCT/KR2013/000640, 3 pages.
(Continued)

*Primary Examiner* — Daniel Samwel

(57) ABSTRACT

A contents sharing network is provided. An operating method of a control device includes determining a current state of possible states in a contents sharing process over a network; and displaying an icon indicating the current state among a plurality of predefined icons. The states are defined as a combination of at least one item of network connection, device discovery, a type of the discovered device, the number of the discovered devices, and existence of an available additional service.

20 Claims, 9 Drawing Sheets

Related U.S. Application Data continuation of application No. 15/853,451, filed on Dec. 22, 2017, now Pat. No. 11,153,356, which is a continuation of application No. 13/756,152, filed on Jan. 31, 2013, now Pat. No. 9,854,012.

(51) Int. Cl.
*H04L 12/28* (2006.01)
*H04N 21/422* (2011.01)

(52) U.S. Cl.
CPC .. *H04L 12/2812* (2013.01); *H04L 2012/2849* (2013.01); *H04N 21/42209* (2013.01)

(56) References Cited

U.S. PATENT DOCUMENTS

| | | | |
|---|---|---|---|
| 7,716,585 | B2 | 5/2010 | Glass |
| 8,054,211 | B2 | 11/2011 | Vidal |
| 8,064,894 | B1 | 11/2011 | Bill et al. |
| 8,478,662 | B1* | 7/2013 | Snodgrass ............ G06F 16/335 705/26.7 |
| 2002/0040389 | A1* | 4/2002 | Gerba ................ H04L 67/01 709/219 |
| 2002/0078150 | A1 | 6/2002 | Thompson et al. |
| 2004/0172586 | A1 | 9/2004 | Ragnet et al. |
| 2005/0073522 | A1 | 4/2005 | Aholainen et al. |
| 2005/0138137 | A1 | 6/2005 | Encarnacion et al. |
| 2005/0172228 | A1 | 8/2005 | Kakuda |
| 2006/0026289 | A1 | 2/2006 | Lyndersay et al. |
| 2006/0053375 | A1 | 3/2006 | Humpleman et al. |
| 2006/0229016 | A1 | 10/2006 | Jang et al. |
| 2006/0242259 | A1 | 10/2006 | Vallabh et al. |
| 2006/0276133 | A1* | 12/2006 | Ly .......................... H04W 8/26 455/41.2 |
| 2007/0067734 | A1 | 3/2007 | Cunningham et al. |
| 2007/0211691 | A1 | 9/2007 | Barber et al. |
| 2007/0281691 | A1 | 12/2007 | Svensson |
| 2008/0085740 | A1 | 4/2008 | Lee |
| 2008/0222551 | A1 | 9/2008 | Takamune |
| 2008/0242220 | A1* | 10/2008 | Wilson .............. H04M 1/72412 455/3.04 |
| 2009/0054068 | A1 | 2/2009 | Halkka et al. |
| 2009/0228820 | A1 | 9/2009 | Kim et al. |
| 2009/0319906 | A1 | 12/2009 | White et al. |
| 2010/0010389 | A1 | 1/2010 | Davis et al. |
| 2010/0123724 | A1 | 5/2010 | Moore et al. |
| 2010/0131978 | A1 | 5/2010 | Friedlander et al. |
| 2010/0149345 | A1 | 6/2010 | Hashimoto |
| 2010/0184374 | A1 | 7/2010 | Ohkita |
| 2010/0257251 | A1 | 10/2010 | Mooring et al. |
| 2010/0285785 | A1 | 11/2010 | Wang et al. |
| 2011/0115699 | A1 | 5/2011 | Ito et al. |
| 2011/0126104 | A1 | 5/2011 | Woods et al. |
| 2011/0131518 | A1 | 6/2011 | Ohashi |
| 2011/0283334 | A1* | 11/2011 | Choi .................... H04L 67/148 725/148 |
| 2011/0294547 | A1 | 12/2011 | Ni |
| 2012/0001724 | A1 | 1/2012 | Belimpasakis |
| 2012/0057683 | A1* | 3/2012 | Liik .................. H04M 3/42195 379/32.01 |
| 2012/0159340 | A1 | 6/2012 | Bae et al. |
| 2013/0028132 | A1 | 1/2013 | Choi |
| 2013/0081083 | A1 | 3/2013 | Yu et al. |
| 2013/0151963 | A1* | 6/2013 | Costenaro ............... G06F 9/453 715/711 |
| 2013/0170813 | A1* | 7/2013 | Woods .................. H04N 5/765 386/E5.002 |
| 2013/0191757 | A1 | 7/2013 | Smith et al. |
| 2014/0136978 | A1 | 5/2014 | Verma |

FOREIGN PATENT DOCUMENTS

| | | |
|---|---|---|
| KR | 10-2006-0107299 A | 10/2006 |
| KR | 10-2008-0034368 A | 4/2008 |
| KR | 10-2008-0071783 A | 8/2008 |
| KR | 10-2011-0126438 A | 11/2011 |
| WO | 1998059479 A1 | 12/1998 |

OTHER PUBLICATIONS

Written Opinion of International Searching Authority dated May 30, 2013 in connection with International Application No. PCT/KR2013/000640, 5 pages.
Extended European Search Report dated Sep. 10, 2015 in connection with European Patent Application No. 13744006.1; 15 pages.
Office Action dated Jan. 10, 2018 in connection with European Patent Application No. 13744006.1.
European Search Report dated Jan. 17, 2020 in connection with European Application No. EP19209859.8, 9 pages.
European Search Report dated Nov. 5, 2020 in connection with European Application No. EP20202830.4, 7 pages.
Notice of Preliminary Rejection dated Sep. 13, 2017 in connection with Korean Patent Application No. 10-2012-0009592, 11 pages.
Notice of Patent Grant dated Aug. 2, 2018 in connection with Korean Application No. KR 10-2018-0059540, 4 pages.
LG Electronics Inc., "Manual: LG-SU130, rev. 1.3", 2009 (Retrieved from http://www.lgmobile.co.kr/visual/product/manual/pdf/SU130-Rev1.3-0922.pdf), 152 pages.
European Patent Office, "European Search Report," dated Oct. 24, 2022, in connection with European Patent Application No. 22192499.6, 9 pages.

* cited by examiner

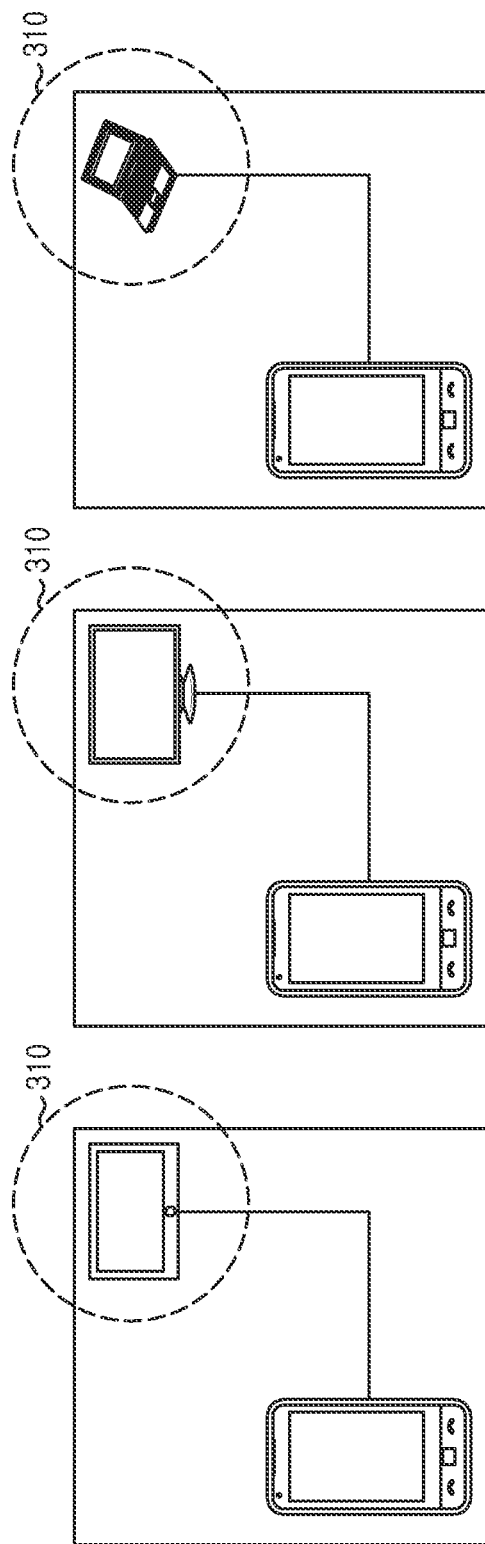

APPARATUS AND METHOD FOR INFORMING OF AVAILABLE DEVICES IN CONTENTS SHARING NETWORK

CROSS-REFERENCE TO RELATED APPLICATIONS

This application is a continuation of U.S. application Ser. No. 17/451,298, filed Oct. 18, 2021, now U.S. Pat. No. 11,582,273, which is a continuation of U.S. application Ser. No. 15/853,451, filed Dec. 22, 2017, now U.S. Pat. No. 11,153,356, which is a continuation of U.S. application Ser. No. 13/756,152, filed Jan. 31, 2013, now U.S. Pat. No. 9,854,012, which claims priority to Korean Application No. 10-2012-0009592, filed Jan. 31, 2012, the disclosures of which are hereby incorporated by reference in their entirety.

BACKGROUND

1. Field

The present invention relates generally to contents sharing in a network.

2. Description of Related Art

As performances of mobile terminals and digital devices are improved recently, a demand for services for sharing contents between the mobile terminal and the digital device is gradually increasing. To share the contents, it is necessary to configure connection in a network between the smart phone and the digital device. For the contents sharing, the mobile terminal, as a control device, accesses the network, searches for other devices, and shares contents with the discovered devices.

The contents sharing can fail for various reasons. The contents sharing is infeasible, for example, when the mobile terminal does not access the network or when the mobile terminal accesses the network but does not discover other devices. When the contents sharing fails, a user can confirm the failure reason only through a separate identification process. For example, the user needs to additionally check the network connection state. Even when a plurality of devices is discovered, the user cannot recognize them immediately.

As discussed above, when the contents are shared over the network between the devices, the user cannot obtain detailed information of the contents sharing process. For this reason, it is necessary to provide a solution for increasing user convenience by providing the user with information regarding various states occurring in the contents sharing process.

SUMMARY

To address the above-discussed deficiencies of the prior art, it is a primary aspect of the present invention to provide an apparatus and a method for providing user with information regarding various states occurring in a contents sharing process in a network.

Another aspect of the present invention is to provide an apparatus and a method for displaying network connection state in a contents sharing process in a network.

Yet another aspect of the present invention is to provide an apparatus and a method for displaying the number of devices discovered in a contents sharing process in a network.

Still another aspect of the present invention is to provide an apparatus and a method for displaying the number of available services in a contents sharing process in a network.

According to one aspect of the present invention, an operating method of a control device in a contents sharing network includes determining a current state of possible states in a contents sharing process over a network; and displaying an icon indicating the current state among a plurality of predefined icons. The states are defined as a combination of at least one item of network connection, device discovery, a type of the discovered device, the number of the discovered devices, and existence of an available additional service.

According to another aspect of the present invention, an apparatus of a control device in a contents sharing network includes a display unit; at least one processor; a memory; and one or more modules stored to the memory and executed by the at least one processor. The module determines a current state of possible states in a contents sharing process over a network, and comprises an instruction for displaying an icon indicating the current state among a plurality of predefined icons, and the states are defined as a combination of at least one item of network connection, device discovery, a type of the discovered device, the number of the discovered devices, and existence of an available additional service.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A to 3C illustrate icons indicating one device discovered in the contents sharing network according to an exemplary embodiment of the present invention;

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network.

Exemplary embodiments of the present invention provide a technique for providing a user with information of various states occurring in a contents sharing process in a network.

Figure 1:
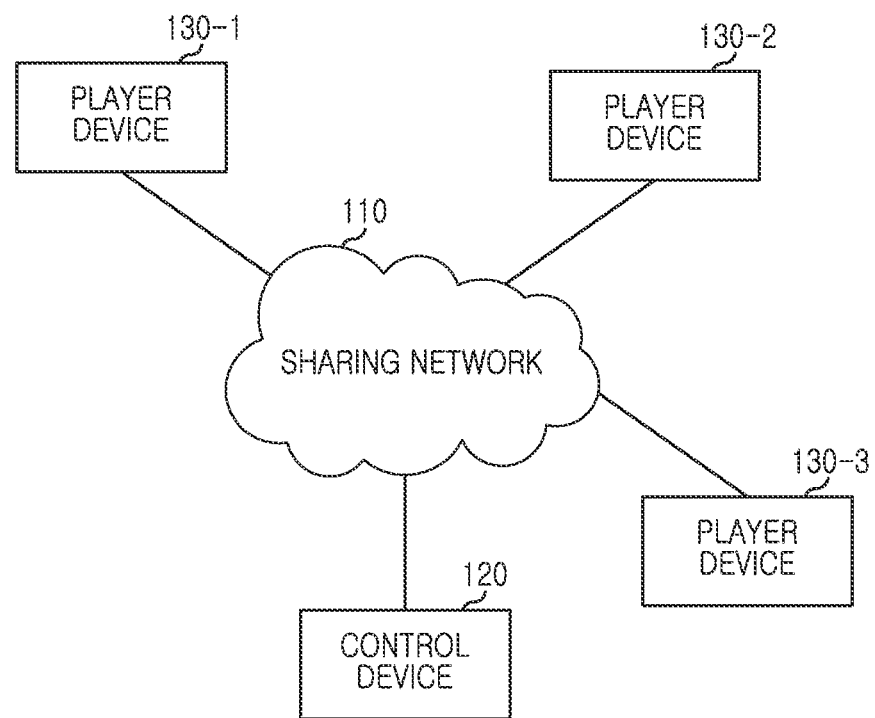
FIG. 1 illustrates a contents sharing network according to an exemplary embodiment of the present invention.

FIG. 1 illustrates a contents sharing network according to an exemplary embodiment of the present invention.

Referring to FIG. 1, the contents sharing network includes a sharing network 110, a control device 120, and player devices 130.

The sharing network 110 is a communication interface for exchanging data between the devices 120 and 130. The sharing network 110 can be wired or wireless. For example, the sharing network 110 can be configured based on a wireless Local Area Network (LAN). In this example, the sharing network 110 can include an Access Point (AP). For example, the sharing network 110 can be configured based on a communication standard such as Institute of Electrical and Electronics Engineers (IEEE) 802.3i, IEEE 802.3u, and IEEE 802.11a/b/g. The sharing network 110 can be referred to as a home network.

The control device 120 holds contents and controls the player devices 130. In detail, the control device 120 can output its stored contents through the player device 130. The control device 120 searches for the player device 130. For example, the control device 120 can be a mobile terminal such as mobile phone, smart phone, laptop computer, or tablet Personal Computer (PC).

The player device 130 plays the contents under the control of the control device 120. For example, the player device 130 can be an electronic product such as PC, television (TV), audio, camera, refrigerator, and vacuum cleaner. The mobile terminal can function as the player device 130. For example, when the player device 130 includes a display means such as PC, TV, or camera, the player device 130 can display images or videos provided from the control device 120. When the player device 130 includes a sound output means such as PC, TV, or audio, the player device 130 can output sound data provided from the control device 120.

In the contents sharing network of FIG. 1, a user can play the contents stored to the control device 120 through the player device 130 by controlling the control device 120. In so doing, the control device 120 provides the user with information regarding various states occurring in the contents sharing process using a plurality of predefined icons. Hereafter, the present invention uses the term 'icon'. The term 'icon' represents image-based mark to deliver information to the user through User Interface (UI) and can be replaced by a term 'image', 'indicator', or 'notification'. For example, the icons are shown in FIGS. 2 through 5.

The control device 120 can determine whether there is an additional service provided together with the playing content, and inform of the number and the type of the available additional services. For example, the additional service can include information service of a person (e.g., a singer or a composer for music, and a director or an actor for movie) relating to the content, Internet Movie Data Base (IMDB) service (e.g., relevant images, movie synopsis, and review search), and advertisement service. More specifically, the control device 120 can obtain information of the additional service during the contents playback and show the additional service corresponding to the obtained information. For example, the additional service information can include a particular Uniform Resource Location (URL). Herein, the additional service information can be contained in contents data or transmitted from a server which streams the content. In this example, the additional service information can be transmitted to the control device 120 at a specific time (e.g., when a particular character appears in a movie) of the contents playback. Accordingly, the information of the number or the type of the additional services can be generated or extinguished during the contents playback.

Figure 2A:
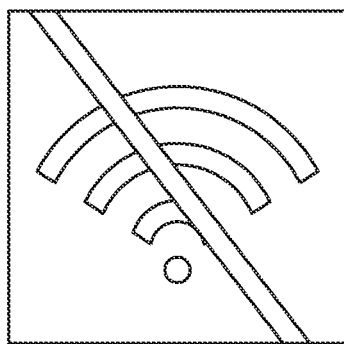
FIGS. 2A and 2B illustrate icons indicating network connection state in the contents sharing network according to an exemplary embodiment of the present invention.
Figure 2B:
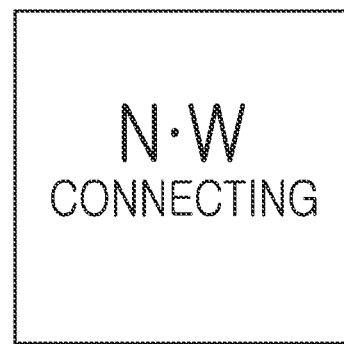

FIGS. 2A and 2B illustrate icons indicating the network connection state in the contents sharing network according to an exemplary embodiment of the present invention. FIG. 2A depicts the icon informing that the control device is not connected to the network, and FIG. 2B depicts the icon informing that the control device is connected to the network.

In FIG. 2A, the icon indicating no network connection is represented using a figure. Alternatively, the icon indicating no network connection can be represented using a figure or a character different from FIG. 2 alone or in combination. In FIG. 2B, the icon indicating the network connection is represented using characters alone. Alternatively, the icon indicating the network connection can be represented using a character or a figure different from FIG. 2 alone or in combination.

FIGS. 3A to 3C illustrate icons indicating one device discovered in the contents sharing network according to an exemplary embodiment of the present invention. FIG. 3A depicts the icon informing that only the TV is discovered as the player device, FIG. 3B depicts the icon informing that only the PC is discovered as the player device, and FIG. 3A depicts the icon informing that only the laptop computer is discovered as the player device.

Referring to FIGS. 3A, 3B and 3C, the icon indicating the single device discovered includes a first mark 310 indicating the type of the single device discovered. In FIGS. 3A to 3C, the first mark 310 is represented using a figure or an image. In other exemplary embodiments of the present invention, the first mark 310 can be represented using a different figure or image from that illustrated FIGS. 3A to 3C or using the figure and the character alone or in combination. While the icons of FIGS. 3A to 3C include the mark of the mobile terminal in the left lower part, the mark of the mobile terminal can be replaced by a different shape or omitted.

Figure 4A:
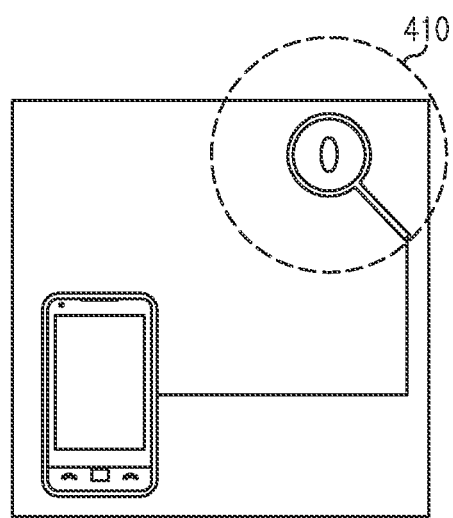
FIGS. 4A and 4B illustrate icons indicating no device discovered or a plurality of devices discovered in the contents sharing network according to an exemplary embodiment of the present invention.
Figure 4B:
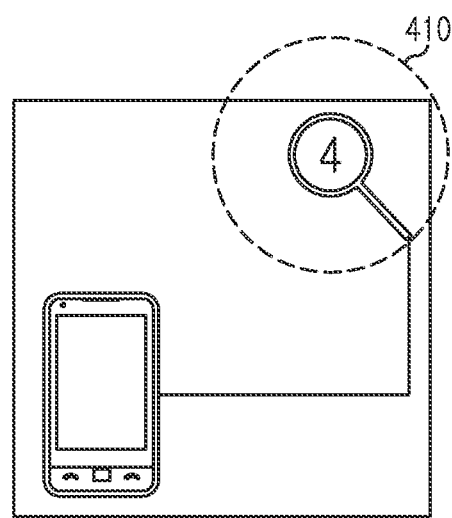

FIGS. 4A and 4B illustrate icons indicating no device discovered or a plurality of devices discovered in the contents sharing network according to an exemplary embodiment of the present invention. FIG. 4A depicts the icon indicating no device discovered, and FIG. 4B depicts the icon indicating a plurality of devices discovered.

Referring to FIGS. 4A and 4B, the icon indicating no device discovered and the icon indicating the plurality of the devices discovered include a second mark 410 indicating the number of the discovered devices. In FIGS. 4A and 4B, the second mark 410 is represented in combination of the figure and the number. In other exemplary embodiments of the present invention, the second mark 410 can be represented in combination of the figure and the number different from FIGS. 4A and 4B, using the character or the number alone or in combination, or using the figure alone. While the icons of FIGS. 4A and 4B include the mark of the mobile terminal in the left lower part, the mark of the mobile terminal can be replaced by a different shape or omitted.

Figure 5A:
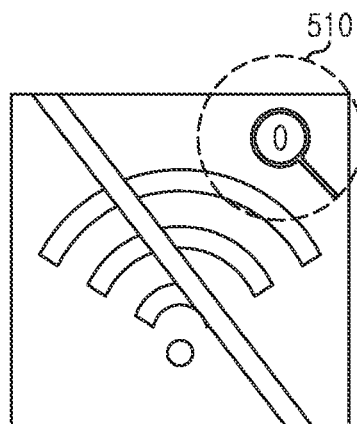
FIGS. 5A to 5E illustrate icons indicating existence of an available additional service in the contents sharing network according to an exemplary embodiment of the present invention.
Figure 5B:
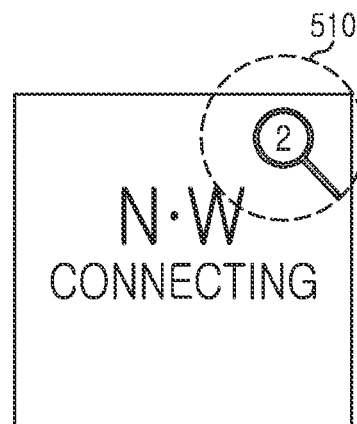
Figure 5C:
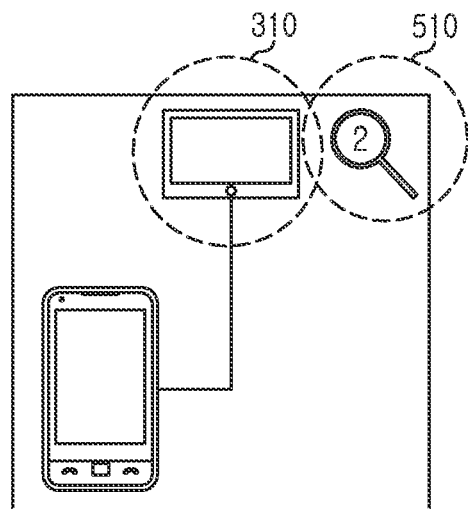
Figure 5D:
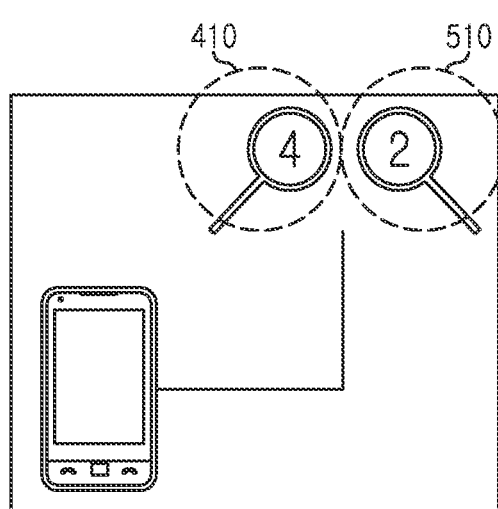
Figure 5E:
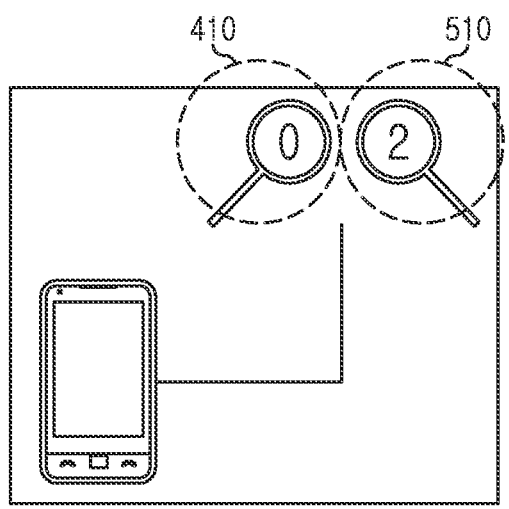

FIGS. 5A to 5E illustrates icons indicating existence of an available additional service in the contents sharing network according to an exemplary embodiment of the present invention. FIG. 5A depicts the icon indicating the available additional service when the control device is not connected to the network, FIG. 5B depicts the icon indicating the available additional service when the control device is connected to the network, FIG. 5C depicts the icon indicating the available additional service when the single device is discovered, FIG. 5D depicts the icon indicating the available additional service when a plurality of devices is discovered, and FIG. 5E depicts the icon indicating the available additional service when no device is discovered.

Referring to FIGS. 5A to 5E, the icons indicating the existence of the available additional service include a third mark 510 indicating the number of the available additional services. The third mark 510 can be displayed any time regardless of whether the network is connected, whether the device is discovered, and the number of the discovered devices as shown in FIGS. 5A to 5E. This is because the additional service relates to the playing content. Referring to FIGS. 5D and 5E, the second mark 410 and the third mark 510 indicating the number of the discovered devices are represented in similar shapes. The second mark 410 and the third mark 510 can be represented in different shapes for clear distinction. In FIGS. 5A to 5E, the third mark 510 is represented in combination of the figure and the number. In other exemplary embodiments of the present invention, the third mark 510 can be represented in combination of the figure and the number different from FIGS. 5A to 5E, using the character or the number alone or in combination, or using the figure alone.

Figure 6:
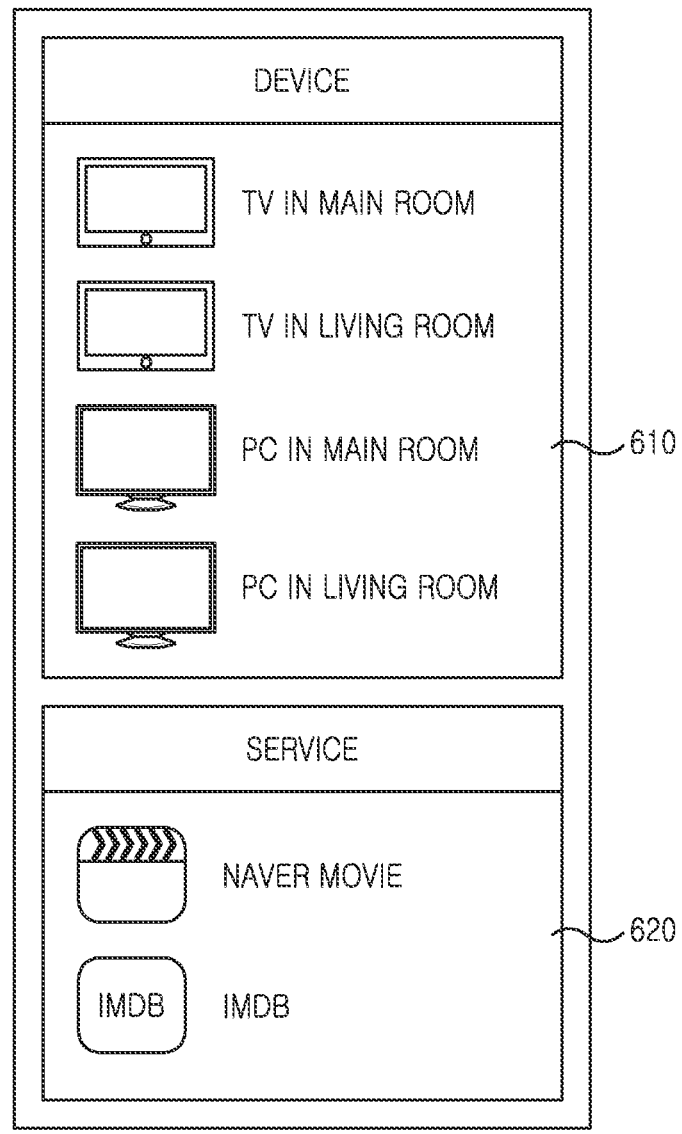
FIG. 6 illustrates a device list and a service list in the contents sharing network according to an exemplary embodiment of the present invention.

When the plurality of the devices is searched and the plurality of the additional services is available as shown in FIG. 5D, the control device can provide the user with a list of the discovered devices and a list of the additional services. For example, the list of the devices and the list of the additional services can be formed as shown in FIG. 6. FIG. 6 depicts the device list and the service list in the contents sharing network according to an exemplary embodiment of the present invention. In FIGS. 5A to 5E, the device list 610 includes four devices and the service list 620 includes two additional services.

As stated above, the control device determines the current state of the possible states in the contents sharing process over the network and displays the icon indicating the current state among the plurality of the predefined icons. In so doing, the states are defined as the combination of at least one item of the network connection or disconnection, the device discovery, the type of the discovered device, the number of the discovered devices, and the presence of the available additional service. The predefined icons include at least one of the icon indicating no network connection, the icon indicating the network connection, the icon indicating no device discovered, the icon indicating the single device discovered, the icon indicating the multiple devices discovered, the icon indicating existence of the available additional service, and the icon indicating the number of the available additional services.

Figure 7A:
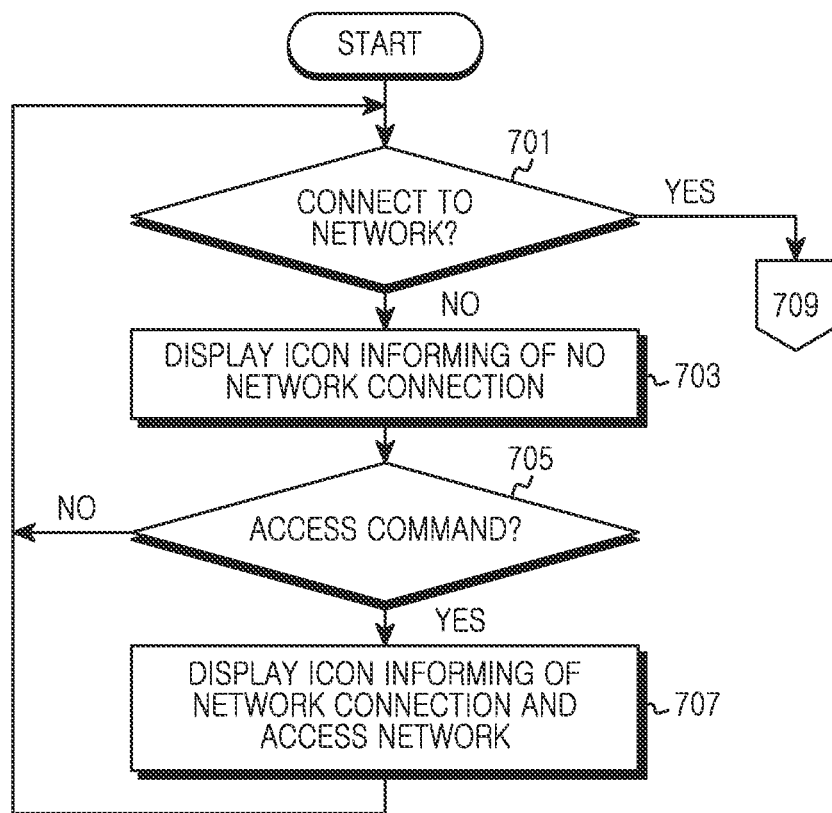
FIGS. 7A and 7B illustrate operations of a control device in the contents sharing network according to an exemplary embodiment of the present invention.
Figure 7B:
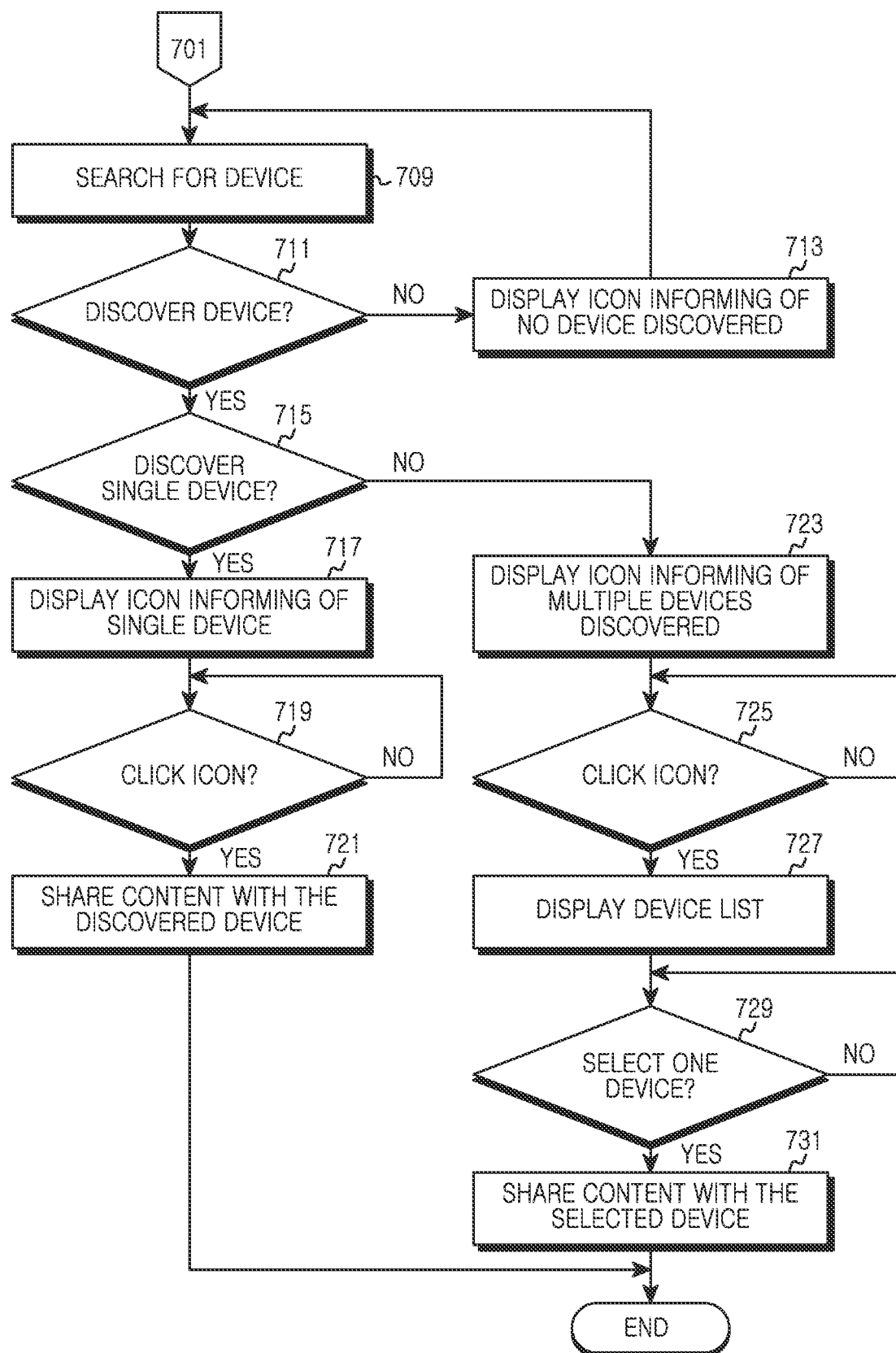

FIGS. 7A and 7B illustrate operations of the control device in the contents sharing network according to an exemplary embodiment of the present invention.

Referring to FIGS. 7A and 7B, the control device determines whether the control device is connected to the network in step 701. Whether the network is connected can be determined when an application supporting the contents sharing is executed. That is, to share the contents over the network, the control device initially determines whether the control device is connected to the network.

When the network is not connected, the control device displays the icon indicating no network connection in step 703. For example, the icon indicating no network connection is shown in FIG. 2A. In so doing, when there is the additional service provided together with the playing content, the icon indicating no network connection can include the mark indicating the existence of the additional service and the number of the additional services as shown in FIG. 5A.

In step 705, the control device determines whether a user's access command occurs. For example, when the network is configured based on the wireless LAN, the control device determines whether the user instructs to access a particular AP.

When the access command occurs, the control device displays the icon indicating the network connection and accesses the network in step 707. For example, the icon indicating the network connection is shown in FIG. 2B. At this time, when there is the additional service provided together with the playing content, the icon indicating the network connection can include the mark indicating the existence of the additional service and the number of the additional services as shown in FIG. 5B. Next, the control device returns to step 701.

When the network is connected in step 701, the control device searches for the device connected to the network in step 709. For example, the control device can search for other device by trying to receive a packet from the other device. Alternatively, the control device can search for other device by transmitting a packet requesting a response to the other device and checking whether the response is received. The device search can be performed periodically at regular time intervals during the network connection.

In step 711, the control device determines whether at least one device is discovered. For example, the control device determines whether a packet is received from other device or whether other device responds to the request of the control device.

When detecting no device, the control device displays the icon indicating no device discovered in step 713. For example, the icon indicating no device discovered is shown in FIG. 4A. In so doing, when there is the additional service provided together with the playing content, the icon indicating no device discovered can include the mark indicating the existence of the additional service and the number of the additional services as shown in FIG. 5E. Next, the control device goes back to step 709.

By contrast, when detecting at least one device, the control device determines whether the number of the discovered devices is one in step 715.

When the number of the discovered devices is one, the control device displays the icon indicating the single device discovered in step 717. The icon indicating the single device discovered includes the mark indicating the type of the discovered device. For example, the icon indicating the single device discovered is shown in FIG. 3A, 3B, or 3C. In so doing, when there is the additional service provided together with the playing content, the icon indicating the single device discovered can include the mark indicating the existence of the additional service and the number of the additional services as shown in FIG. 5C.

In step 719, the control device determines whether the icon indicating the single device discovered is clicked. The click can be recognized through an input means such as touch screen, keypad, or touch pad.

When the icon indicating the single device discovered is clicked, the control device shares the playing contents with the one device discovered in step 721. In detail, the control device compares protocol and media format of the playing contents with protocol and media format supported by the discovered device. When the discovered device can play the content, the control device transmits data of the playing contents or information (e.g., Uniform Resource Identifier (URI)) required to play the content.

When the number of the discovered devices is two or more in step 715, the control device displays the icon indicating the multiple devices discovered in step 723. The icon indicating the multiple devices discovered includes the mark indicating the number of the discovered devices. For example, the icon indicating the multiple devices discovered is shown in FIG. 4B. In so doing, when there is the additional service provided together with the playing content, the icon indicating the multiple devices discovered can include the mark indicating the existence of the additional service and the number of the additional services as shown in FIG. 5D.

In step 725, the control device determines whether the icon indicating the multiple devices discovered is clicked. The click can be recognized through the input means such as touch screen, keypad, or touch pad.

When the icon indicating the multiple devices discovered is clicked, the control device displays the list of the discovered devices in step 727. At this time, when the available additional service exists and the icon indicating the multiple devices discovered includes the mark indicating the existence and the number of the additional services, the list of the additional services is displayed together as shown in FIG. 6.

In step 729, the control device determines whether one device is selected in the device list. The selection can be recognized through the input means such as touch screen, keypad, or touch pad.

When one device is selected, the control device shares the playing contents with the one device discovered in step 731. In detail, the control device compares the protocol and the media format of the playing contents with the protocol and the media format supported by the discovered device. When the discovered device can play the content, the control device transmits the data of the playing contents or the information (e.g., URI) required to play the content.

Although not illustrated in FIG. 7B, when the additional service list is displayed in step 727, the control device determines whether one additional service is selected. When one additional service is selected, the control device can execute the selected additional service. When the icon includes the mark indicating the existence of the additional service in steps 703, 705, 713 and 717, the control device can determine whether the icon is clicked. When the icon is clicked, the control device can display the additional service list. Next, the control device determines whether one additional service is selected. When one additional service is selected, the control device can execute the selected additional service.

Figure 8:
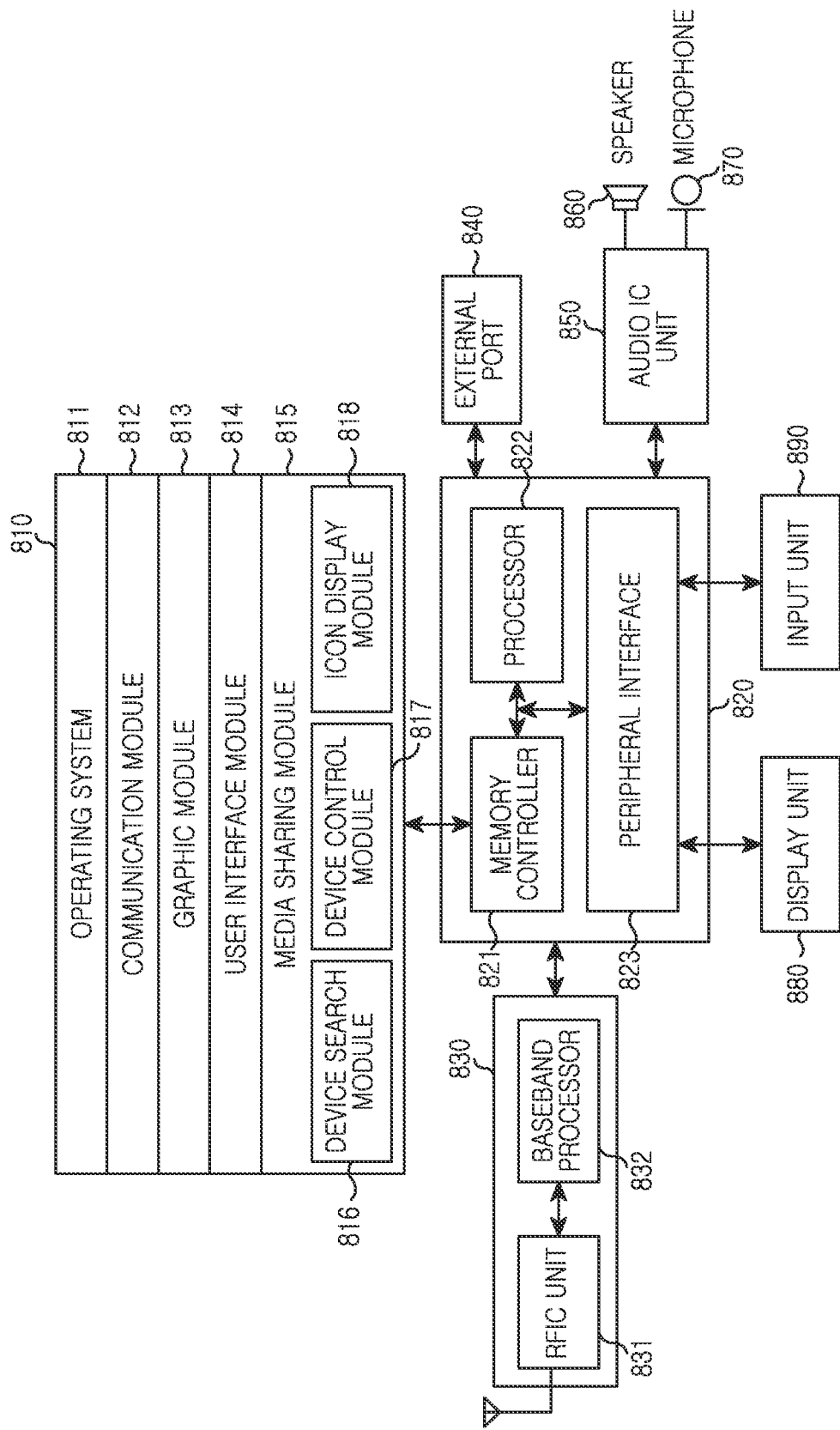
FIG. 8 illustrates the control device in the contents sharing network according to an exemplary embodiment of the present invention.

FIG. 8 is a block diagram of the control device in the contents sharing network according to an exemplary embodiment of the present invention. The control device of FIG. 8 is a device such as portable terminal, mobile phone, mobile pad, media player, tablet computer, handheld computer, and Personal Digital Assistant (PDA). The control device may be any device combining two or more functions of those devices.

Referring to FIG. 8, the control device includes a memory 810, a processor unit 820, a communication unit 830, an external port 840, an audio Integrated Circuit (IC) unit 850, a speaker 860, a microphone 870, a display unit 880, and an input unit 890. A plurality of the memories 810 and a plurality of the external ports 840 can be provided.

The processor unit 820 includes a memory controller 821, a processor 822, and a peripheral interface 823. Herein, the processor 822 can be referred to as a Central Processing unit (CPU) and two or more processors 822 can be provided. The communication unit 830 includes a baseband processor 832 and a Radio Frequency Integrated Circuit (RFIC) unit 831. Those components communicate with each other through one or more communication buses or signal lines. The components can be implemented using hardware such as one or more ICs, or using software. Also, the components can be implemented using a combination of the hardware and the software. The control device of FIG. 8 is exemplary, and can include more or less components than the components of FIG. 8. The components can be configured differently from FIG. 8.

The memory 810 can include a non-volatile memory such as random access memory or flash memory, a Read Only Memory (ROM), an Electrically Erasable Programmable ROM (EEPROM), a magnetic disc storage device, a Compact Disc (CD)-ROM, Digital Versatile Discs (DVDs), other optical storage devices, a magnetic cassette, or a combination of part or all of the same. A plurality of such memories may be provided.

The control device can further include, as a memory, an attachable storage device which is accessible via a communication network such as Internet, Intranet, LAN, Wide LAN (WLAN), or Storage Area Network (SAN), or via a communication network configured with a combination of the same. The storage device can access the control device through the external port 840. A separate storage device in the communication network may access the control device through the RFIC unit 831.

The memory 810 stores software. The memory 810 includes operating system software 811, software, a communication software module 812, a graphic software module 813, a user interface software module 814, and a media sharing module 815. Herein, the module can be expressed as an instruction set. When other component such as processor 822 or peripheral interface 823 of the processor unit 820 accesses the memory 810, the memory controller 821 controls.

The operating system software 811 includes various software components for controlling general system operations. For example, the operating system software 811 can be WINDOWS, LINUX, Darwin, RTXC, UNIX, OS X, or an embedded operating system such as VxWorks. For example, the control of the system operation embraces memory management and control, storage hardware (device) control and management, and power control and management. The operating system software 811 also functions to facilitate communication between various hardware (devices) and software components.

The communication software module 812 includes various software components for processing data transmitted and received via the RFIC unit 831 or the external port 840. The graphic software module 813 includes various software components for providing and displaying graphics on the display unit 880. The term 'graphics' encompasses text, web page, icon, digital image, video, and animation. The user interface module 814 includes various software components relating to a user interface. The user interface module 814 includes data about the change of the user interface state or the condition of the user interface state change.

The media sharing module 815 includes software components for fulfilling the contents sharing process according to an exemplary embodiment of the present invention. The media sharing module 815 includes a device search module 816, a device control module 817, and an icon display module 818. The device search module 816 includes software components for searching for other device in the network. The device control module 817 includes software components for controlling the other device discovered in the network to play the content. The icon display module 818 includes icons for indicating the state occurring in the contents sharing, and software components for displaying the icons through the display unit 880. For example, the media sharing module 815 includes software components for carrying out the method of FIGS. 7A and 7B. The software component can be referred to as an instruction, a code, and a program.

The external port 840 can include, for example, but not limited to, a Universal Serial Bus (USB) or a FIREWIRE. The external port 840 is used to connect directly to other device or to connect indirectly to other device via the network (e.g., Internet, Intranet, wireless LAN, etc.)

The peripheral interface 823 connects input/output peripheral devices of the control device to the processor 822 and the memory 810 under the control of the memory controller 821. The control device can include a plurality of processors 822. Using various software programs, the processor 822 performs diverse functions for the control device, and processes and controls voice communication and data communication. In addition to those typical functions, the processor 822 executes a particular software module (instruction set) stored to the memory 810 and performs various functions corresponding to the particular module.

The processor 822, the peripheral interface 823, and the memory controller 821 can be embodied in a single chip. Herein, the single-chip construction is referred to as the processor unit 820. Notably, these components can be embodied as separate chips, rather than the single chip.

The communication unit 830 includes the RFIC unit 831 and the baseband processor 832. The RFIC unit 831 transmits and receives electromagnetic waves. The RFIC unit 831 converts a baseband signal output from the baseband processor 832 to the electromagnetic waves and transmits the electromagnetic waves over an antenna. The RFIC unit 831 converts and provides the electromagnetic waves received over the antenna, to the baseband processor 832. The RFIC unit 831 includes an RF transceiver, an amplifier, a tuner, an oscillator, a digital signal processor, a Coding-Decoding (CODEC) chip set, and a Subscriber Identity Module (SIM) card.

The RFIC unit 831 communicates with the communication network and the other communication device through the electromagnetic waves. For example, the RFIC unit 831 communicates with a wireless network such as Internet, Intranet, network, cellular phone network, wireless LAN or wireless Metropolitan Area Network (MAN), and can communicate with other electronic device through the wireless communication. The wireless communication can use Time Division Multiple Access (TDMA), Global System for Mobile Communication (GSM), Enhanced Data GSM Environment (EDGE), Code Division Multiple Access (CDMA), Wideband (W)-CDMA, Bluetooth, Voice over Internet Protocol (VoIP), Wireless Fidelity (Wi-Fi), Wi-MAX, e-mail, instant messaging, and Short Message Service (SMS) protocol, or a combination of the various communication schemes.

The RFIC unit 831 frequency-converts an RF signal received over the antenna, provides the converted signal to the baseband processor 832, frequency-converts a baseband signal output from the baseband processor 832, and transmits the converted signal over the antenna. The baseband processor 832 processes the baseband signal. For example, for the transmission in the CDMA communication, the baseband processor 832 channel-encodes and spreads data to transmit. For the reception, the baseband processor 832 de-spreads and channel-decodes a received signal.

The audio IC unit 850 communicates with the user through the speaker 860 and the microphone 870. That is, the audio IC unit 850 provides an audio interface between the user and the control device with the speaker 860 and the microphone 870. The audio IC unit 850 receives a data signal from the peripheral interface 823 of the processor unit 820 and converts the received data signal to an electric signal. The converted electric signal is fed to the speaker 860, and the speaker 860 converts and outputs the electric signal to sound waves audible by the person. The microphone 816 converts sound waves received from the person or other sound sources to the electric signal. The audio IC unit 850 receives the converted electric signal. The audio IC unit 850 converts the received electric signal to an audio data signal and sends the converted audio data signal to the peripheral interface 823. The audio data is transmitted to the memory 820 or the communication unit 830 through the peripheral interface 823. The audio IC unit 850 can include a jack (not shown) for providing the interface to an attachable and detachable ear phone, head phone, or head set. The head set can allow both of the output (a single-earpiece or double-earpiece head phone) and the input (a microphone). The jack can be called an earphone jack or a headset jack.

The display unit 880 provides an output interface between the control device and the user. The input unit 890 provides an input interface between the control device and the user. When the display unit 880 is a touch screen, the display unit 880 and the input unit 890 can be constructed as a single block. In this example, the display unit 880 sends the user's touch input to the control device. The medium for showing the output of the control device to the user; that is, the display unit 880 shows the visual output to the user. The visual output is represented as text, graphics, video, or a combination of them. The user inputs through the display unit 880 using haptic contact, tactile contact, or a combination of them. The display unit 880 has a touch sensing face for receiving the user input. For example, a contact point between the display unit 880 and the user corresponds to a digit of a finger of the user contact. The user can contact the display unit 880 using an adequate object such as stylus pen. When the user inputs through the touch screen, the display unit 880 detects the contact by interworking with the relevant software module (instruction set). The detected contact is converted to an interaction corresponding to the user interface object (for example, a soft key) displayed on the display unit 880.

The display unit 880 can employ various display technologies. For example, the display unit 880 can use, but not limited to, Liquid Crystal Display (LCD) technology, Light Emitting Diode (LED) technology, Light emitting Polymer Display (LPD) technology, or Organic LED (OLED) technology. The display unit 880 can detect the start, the movement, and the halt or end of the contact using various touch detecting technologies such as capacitive detection, resistive detection, infrared detection or surface acoustic wave detection. For doing so, the display unit 880 can use proximity sensor array technology or other technologies for determining the contact point on the touch screen. The visual output is not represented, and a touch detection tablet for detecting only the touch input may be used.

Beside the touch screen, the control device can include a touch pad (not shown) for activating or deactivating a particular function. Unlike the touch screen, the touch pad sometimes detects only the touch input without displaying the visual output. The touch pad can have a separate touch sensing face detached from the display unit 880, or may be formed in an extension portion of the touch sensing face of the display unit 880.

The control device includes a power system (not shown) for supplying power to its components. The power system can include a power source (AC power source or battery), a power error detection circuit, a power converter, a power inverter, and a charging device or/and a power level display device (LED). Also, the power system can include a power management and control device for generating, managing, and distributing the power.

The control device can input and use various functions executable by inputting to the display unit 880, through a touch pad. Such functions can use a physical input/control device (e.g., a dial or buttons), which corresponds to a push button for turning on/off and locking the control device, a volume control rocker button, and a slider switch for ringer profile and toggling. The control device can have a function for processing voice input to activate or deactivate a preset function through the microphone 870.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Since various possible states in the contents sharing network are displayed using the icons, more efficient service can be provided to the user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a display;
   a communication circuit;
   at least one processor operatively connected with the display and the communication circuit; and
   a memory operatively connected with the at least one processor, wherein the memory is configured to store instructions that, when executed, cause the at least one processor to:
   receive a request for sharing a first content;
   in response to the request for sharing the first content, identify at least one service associated with the first content;
   provide, through the display, a first visual information indicating the identified at least one service;
   identify a state of a connection to a wireless network via the communication circuit;
   in response to identifying that the electronic device is connected to the wireless network, search for at least one other device connected to the wireless network; and
   provide, through the display, a second visual information indicating the searched for at least one other device connected to the wireless network, together with the first visual information.

2. The electronic device of claim 1, wherein the instructions, when executed, cause the at least one processor to provide the second visual information indicating no other device searched, if the searched for at least one other device does not exist.

3. The electronic device of claim 1, wherein the instructions, when executed, cause the at least one processor to:
   provide, if a number of the searched for at least one other device is one, the second visual information indicating the searched for one other device, and
   share the first content with the one other device in response to identifying a selection of the second visual information.

4. The electronic device of claim 1, wherein instructions, when executed, cause the at least one processor to:

provide, if a number of the searched for other devices is two or more, the second visual information indicating multiple other devices searched, provide a list of the searched for other devices in response to identifying a selection of the second visual information, and share the first content with at least one device selected in the list of the searched for other devices.

5. The electronic device of claim 1, wherein the instructions, when executed, cause the at least one processor to provide a third visual information indicating the state of the connection to the wireless network.

6. The electronic device of claim 1, wherein the first visual information includes a type and a number of the at least one service available associated with the first content.

7. The electronic device of claim 1, wherein the instructions, when executed, cause the at least one processor to:
provide a list of the at least one service in response to identifying a selection of the first visual information, and
execute a service selected in the list.

8. The electronic device of claim 1, wherein the instructions, when executed, cause the at least one processor to search for the at least one other device connected to the wireless network based on reception of a packet from the other device or a response to a packet transmitted to the other device.

9. The electronic device of claim 8, wherein the instructions, when executed, cause the at least one processor to search for the at least one other device periodically at predetermined time interval during connection to the wireless network.

10. The electronic device of claim 4, wherein the instructions, when executed, cause the at least one processor to:
identify whether the first content can be played on the at least one device by comparing a protocol and a media format of the first content with a protocol and a media format supported by the at least one device, and
transmit, to the at least one device, data of the first content or information required to play the first content, when the first content can be played on the at least one device.

11. A method for an operation of an electronic device, the method comprising:
receiving a request for sharing a first content;
in response to the request for sharing the first content, identifying at least one service associated with the first content;
providing a first visual information indicating the identified at least one service;
identifying a state of a connection to a wireless network;
in response to identifying that the electronic device is connected to the wireless network, searching for at least one other device connected to the wireless network; and
providing a second visual information indicating the searched for at least one other device connected to the wireless network, together with the first visual information.

12. The method of claim 11, wherein providing the second visual information comprises:
providing the second visual information indicating no other device searched, if the searched for at least one other device does not exist.

13. The method of claim 11, wherein providing the second visual information comprises:
providing, if a number of the searched for at least one other device is one, the second visual information indicating the searched for one other device; and
sharing the first content with the one other device in response to identifying a selection of the second visual information.

14. The method of claim 11, wherein providing the second visual information comprises:
providing, if a number of the searched for other devices is two or more, the second visual information indicating multiple other devices searched,
providing a list of the searched other devices in response to identifying a selection of the second visual information; and
sharing the first content with at least one device selected in the list of the searched other devices.

15. The method of claim 11, further comprising:
providing a third visual information indicating the state of the connection to the wireless network.

16. The method of claim 11, wherein the first visual information includes a type and a number of the at least one service available associated with the first content.

17. The method of claim 11, further comprising:
providing a list of the at least one service in response to identifying a selection of the first visual information; and
executing a service selected in the list.

18. The method of claim 11, wherein searching for the at least one other device connected to the wireless network comprises discovering the at least one other device connected to the wireless network based on reception of a packet from the other device or a response to a packet transmitted to the other device.

19. The method of claim 18, wherein searching for the at least one other device connected to the wireless network comprises discovering the at least one other devices periodically at predetermined time interval during connection to the wireless network.

20. The method of claim 14, further comprising:
identifying whether the first content can be played on the at least one device by comparing a protocol and a media format of the first content with a protocol and a media format supported by the at least one device; and
transmitting, to the at least one device, data of the first content or information required to play the first content, when the first content can be played on the at least one device.

* * * * *